United States Patent
Ahmed et al.

(10) Patent No.: US 7,447,788 B2
(45) Date of Patent: Nov. 4, 2008

(54) PROVIDING HOST INFORMATION TO DEVICES IN MULTI SCSI TRANSPORT PROTOCOLS

(75) Inventors: Ali Ahmed, Round Rock, TX (US); Kevin Marks, Round Rock, TX (US); Ahmad H. Tawil, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 912 days.

(21) Appl. No.: 10/765,496

(22) Filed: Jan. 27, 2004

(65) Prior Publication Data

US 2005/0165786 A1    Jul. 28, 2005

(51) Int. Cl.
*G06F 15/16* (2006.01)

(52) U.S. Cl. .................. 709/230; 710/11; 710/105; 710/315; 719/326

(58) Field of Classification Search ............... 709/230; 710/11, 105, 315; 719/326
See application file for complete search history.

(56) References Cited

U.S. PATENT DOCUMENTS

| | | | |
|---|---|---|---|
| 5,303,344 A * | 4/1994 | Yokoyama et al. | 709/230 |
| 5,438,674 A | 8/1995 | Keele et al. | 395/404 |
| 5,455,926 A | 10/1995 | Keele et al. | 395/404 |
| 5,491,693 A * | 2/1996 | Britton et al. | 370/401 |
| 5,583,922 A | 12/1996 | Davis et al. | 379/96 |
| 5,619,650 A * | 4/1997 | Bach et al. | 709/246 |
| 6,243,386 B1 | 6/2001 | Chan et al. | 370/403 |
| 6,400,730 B1 | 6/2002 | Latif et al. | 370/466 |
| 6,609,167 B1 | 8/2003 | Bastiani et al. | 710/104 |
| 6,636,922 B1 | 10/2003 | Bastiani et al. | 710/305 |
| 6,675,243 B1 | 1/2004 | Bastiani et al. | 710/105 |
| 6,738,854 B2 * | 5/2004 | Hoese et al. | 710/315 |
| 6,952,743 B2 * | 10/2005 | Ortega et al. | 710/5 |
| 2002/0124007 A1 * | 9/2002 | Zhao | 707/102 |
| 2002/0144046 A1 | 10/2002 | Hooper, III | 710/316 |
| 2002/0161852 A1 | 10/2002 | Allen et al. | 709/217 |
| 2002/0161951 A1 | 10/2002 | Allen et al. | 710/106 |
| 2002/0162010 A1 | 10/2002 | Allen et al. | 713/200 |
| 2003/0154271 A1 | 8/2003 | Baldwin et al. | 709/223 |
| 2005/0190787 A1 * | 9/2005 | Kuik et al. | 370/466 |

FOREIGN PATENT DOCUMENTS

| | | |
|---|---|---|
| GB | 2380643 A | 4/2003 |
| JP | 2002324042 | 11/2002 |
| WO | WO 00/14645 | 3/2000 |
| WO | WO 01/35188 A2 | 5/2001 |
| WO | WO 01/44891 A2 | 6/2001 |
| WO | WO 02/03610 A2 | 1/2002 |

* cited by examiner

*Primary Examiner*—Michael Won
(74) *Attorney, Agent, or Firm*—Baker Botts L.L.P.

(57) ABSTRACT

Systems, methods, and data structures are provided for identifying host information at a physical layer of an information handling system. The method includes issuing a command from a host computer and sending a host information command to a device. The command may be issued in a first transport protocol. The host information command may include a host identifier identifying the host that issued the command and a tag identifying a reissued command, the reissued command including the command reissued in a second transport protocol.

28 Claims, 7 Drawing Sheets

PROVIDING HOST INFORMATION TO DEVICES IN MULTI SCSI TRANSPORT PROTOCOLS

CROSS-REFERENCE TO RELATED APPLICATIONS

This application is related to U.S. patent application Ser. No. 10/731,222, entitled "Identifying Hosts at a Physical Layer" by Richard Golasky and Daniel McConnell, which was filed on Dec. 9, 2003, and which is incorporated herein by reference in its entirety for all purposes.

BACKGROUND OF THE INVENTION TECHNOLOGY

1. Field of the Invention

This invention relates, in general, to information handling systems, and more particularly, to an information handling system that may provide host information to target devices behind an appliance in multi SCSI transport protocols.

2. Background of the Related Art

An information handling system generally processes, compiles, stores, and/or communicates information or data for business, personal, or other purposes thereby allowing a user to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

When a host computer having a SCSI parallel interface sends a SCSI command, data, and status to a storage device having a SCSI parallel interface, the Input/Output (I/O) occurs over the SCSI bus without a need of transport protocol. When the two interfaces are not SCSI however, the SCSI command, data messages, and status are sent and received through an interface such as Fibre Channel, iSCSI, Infiniband, or Serial Attached SCSI. In these cases the physical interfaces are not SCSI. However, since these interfaces may be considered SCSI "talk devices" the transport protocol of the respective physical interface is used. The SCSI information is encapsulated in a frame or packet. In a multi protocol host environment, a large number of hosts implementing various Input/Output (I/O) protocol may share a storage device through a Multi Protocol Network Switch and a Multi Protocol Appliance. Other example appliances include bridges, gateways, routers, expanders, and switches.

An appliance may translate a packet or a frame from a non-SCSI physical interface initiator (host) interface. The encapsulated SCSI information may be command, data, and status, or other variations. An appliance will strip off the information in the packet or frame and will only send the SCSI command, data, status to the target shared storage device. Hence, the host information will be lost between the appliance and the SCSI physical interface storage device. An analyzer at a SCSI layer will not present the host information such as its physical or logical address. Consequently, identifying and associating the SCSI information to the initiating host at the SCSI layer is problematic. Debugging at the SCSI layer without obtaining information about the issuing host may be inefficient. Debugging may require an analyzer for each transport protocol placed within the respective transport link. This can be expensive, inefficient, and time consuming in a multi-host and/or multi-target configuration where number of hosts can be numerous.

SUMMARY OF THE INVENTION

In general, in one aspect, this invention features a method for identifying host information at a physical layer of an information handling system. The information handling system may include a host computer. The method may include issuing a command from a host computer and sending a host information command to a device. The command may be issued in a first transport protocol. The host information command may include a host identifier identifying the host that issued the command and a tag identifying a reissued command. The reissued command may include the command reissued in a second transport protocol.

In general, in another aspect, this invention features an information handling system for identifying host information at a physical layer of an information handling system. The information handling system may comprise a host computer, a device, and an appliance. The host computer may issue a command in a first transport protocol. The appliance may send a host information command to the device. The host information command may include a host identifier identifying the host that issued the command and a tag identifying a reissued command. The reissued command may include the command reissued in a second transport protocol.

In general, in another aspect, this invention features a data structure for identifying host information at a physical layer. The data structure may comprise a protocol page field, a page format field, a tag field for associating the data structure to a host issued command, a byte number field for identifying a number of bytes of host information, and a payload field. The host information may identify the host computer that issued the host issued command. The payload field may include at least a portion of the host information.

One technical advantage of the disclosed invention is that it provides host information that may be used with or as a debugging tool for use in shared environments, including shared storage environments. The invention provides a method of transporting host information of any SCSI transport protocol to any SCSI target devices of any SCSI transport protocol and its respective protocol analyzers. Another technical advantage is the ability to provide provisioning features including Quality of Service (QOS), LUN masking, data encryption, and security features. Still another technical advantage is the applicability of the invention to any SCSI protocol and other current and future protocols and the scalability of the invention to additional computer nodes. Still another technical advantage is the scalability of the invention to emerging the future "SCSI talk" I/O protocol. Other features and advantages will become apparent from the description and claims that follow.

Other features or advantages will become apparent from the description and claims that follow.

BRIEF DESCRIPTION OF THE DRAWINGS

A more complete understanding of the present disclosure and advantages thereof may be acquired by referring to the following description taken in conjunction with the accompanying drawings wherein.

Figure 1:
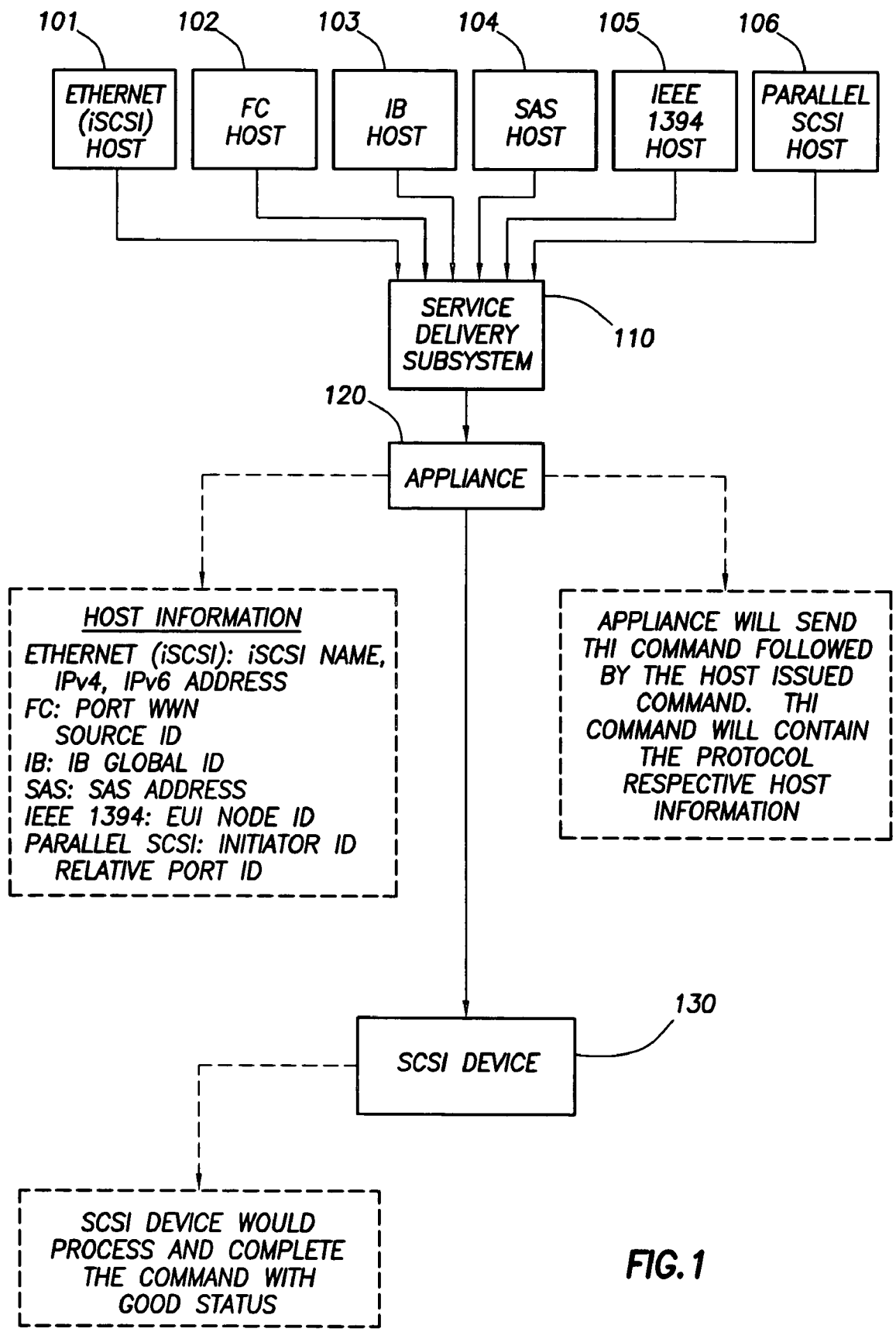
FIG. 1 is a diagram of a system for identifying host information at a SCSI layer in a multi SCSI transport protocol environment.

The present invention may be susceptible to various modifications and alternative forms. Specific embodiments of the present invention are shown by way of example in the drawings and are described herein in detail. It should be understood, however, that the description set forth herein of specific embodiments is not intended to limit the present invention to the particular forms disclosed. Rather, all modifications, alternatives and equivalents falling within the spirit and scope of the invention as defined by the appended claims are intended to be covered.

DETAILED DESCRIPTION OF SPECIFIC EMBODIMENTS

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. Information handling system may also include one or more buses operable to transmit communications between the various hardware components.

FIG. 1 shows one example information handling system that can identify host information at a SCSI layer. As shown in FIG. 1, an information handling system may include one or more host computers, one or more appliances 120, and one or more SCSI devices 130. Each host computer may issue a SCSI command to a SCSI device. The example shown in FIG. 1 includes six different computer hosts: an Ethernet (iSCSI) host 101, a fibre channel (FC) host 102, an infiniband (IB) host 103, a serial attached SCSI (SAS) host 104, an IEEE 1394 host 105, and a parallel SCSI host 106. Each host (101-106) may issue a SCSI command to a SCSI device 130 in a host transport protocol. SCSI commands may be included in a command set that may run any SCSI transport protocol. A SCSI transport protocol on an interface defines a mapping of a SCSI Architectural Model onto the interface.

In one example, an iSCSI transport may run on a TCP/IP interface, a Fibre Channel Protocol (FCP) may run on a FC interface, a SRP protocol may run on an IB interface, a SSP protocol may run on a SAS interface, an Ultra 320 (U320) protocol may run on a Parallel SCSI interface, and a Serial Bus Protocol (SBP) may run over an IEEE 1394 interface.

Each device host (101-106) may be connected to an appliance 120 through Service Delivery Subsystem 110. A Service Delivery Subsystem may comprise an interface. For example, a Service Delivery Subsystem may be FC or SAS. Each host computer may send a SCSI command to appliance 120. Appliance 120 may comprise, for example, a switch, a bridge, an expander, a gateway, or a router. In another example system, Service Delivery Subsystem 110 is not included in an information handling system. Instead, the host computer is connected directly to appliance 120. In still another example system, the appliance may have multiple types of ports. Each port type may support a different I/O interface, and each I/O interface may support a SCSI transport protocol. For example, an appliance may issue SCSI command through a TCP/IP, FC, IB, SAS, or Parallel SCSI interface.

Appliance 120 may create a Vendor Unique Command Descriptor Block "Transfer Host Information" or THI. Transfer host information includes information relating to the host computer that issued the SCSI command. When constructing the THI command, the appliance embeds the host information as it becomes available. The THI command contains the host information (page specific payload). The THI command may be sent to the target from the appliance before each host issued command is sent to the target device. Furthermore, appliance 120 may reissue the SCSI command in the target device transport protocol to the target device.

The THI command is not required to be supported by the target device. If the THI command is supported by the target device, the target device may execute the THI command and may respond to the THI command by returning good status signifying that the command was complete. If the THI command is not supported by the target device, the target device may return a check condition for a THI command. The appliance may receive an Auto Request Sense from the device, or the appliance may send a Request Sense to the device to clear the pending contingent allegiance. The original command, however, is unaffected. The target device may then process the host issued command. Consequently, the operation of THI command followed by the actual host command should be indivisible and atomic. The THI command may be repeated for each SCSI host issued command. Regardless of whether the device supports the THI command, the target SCSI device may respond to the THI command with either a good status or a check condition. The disclosed methods and systems provide a vehicle for transporting as payload issuing host information to enable the determination of the issuing host information at the SCSI layer. A debugging or SCSI analyzer attached at the target may view the payload information to identify information about the issuing host. Moreover, the THI command may support additional protocols at the host computer end and at the target device end.

In one embodiment, the SCSI device 130 may perform one of two tasks upon receiving the THI command. If the firmware of SCSI device 130 has been modified to enable the SCSI device 130 to respond to a THI command, then SCSI device 130 may respond to appliance 120 with a good status upon receiving the THI command. Otherwise, SCSI device 130 may respond to appliance 120 with a check condition or a rejection of the THI command. In either case, the issuing host information may be sent to SCSI device 130 in the form of the THI command. A SCSI analyzer may be connected to the system near SCSI device 130 to view the information sent in the THI command. As a result, a SCSI analyzer may be used to identify issuing host information for debugging purposes.

As shown in FIG. 1, the appliance may provide host information for hosts issuing SCSI commands in multiple transport protocols to a SCSI device of any transport protocol and a respective analyzer. For example, in the case of an Ethernet (iSCSI) host, the iSCSI name in an eui or an iqn format and the iSCSI address, either in an Internet Protocol version 4 (IPv4) or version 6 (IPv6), may be sent from the appliance to SCSI device 130. In the case of a fibre channel (FC) host, the port worldwide name and the source ID may be sent to SCSI device 130. Furthermore, in the case of an Infiniband (IB) host, the IB Global ID (GID) may be sent to SCSI device 130 from the appliance. Moreover, in the case of an SAS host, the SAS initiator address may be sent by the appliance to SCSI device 130. If an IEEE 1394 host issued the SCSI command, then the EUI-64 identifier and the node ID may be sent to the SCSI device from the appliance. Finally, if the SCSI command was issued by parallel SCSI host 106, then an initiator ID or an appliance host ID, and a relative port ID or an appliance port number associated with the host ID may be sent to SCSI device 130.

Figure 2:
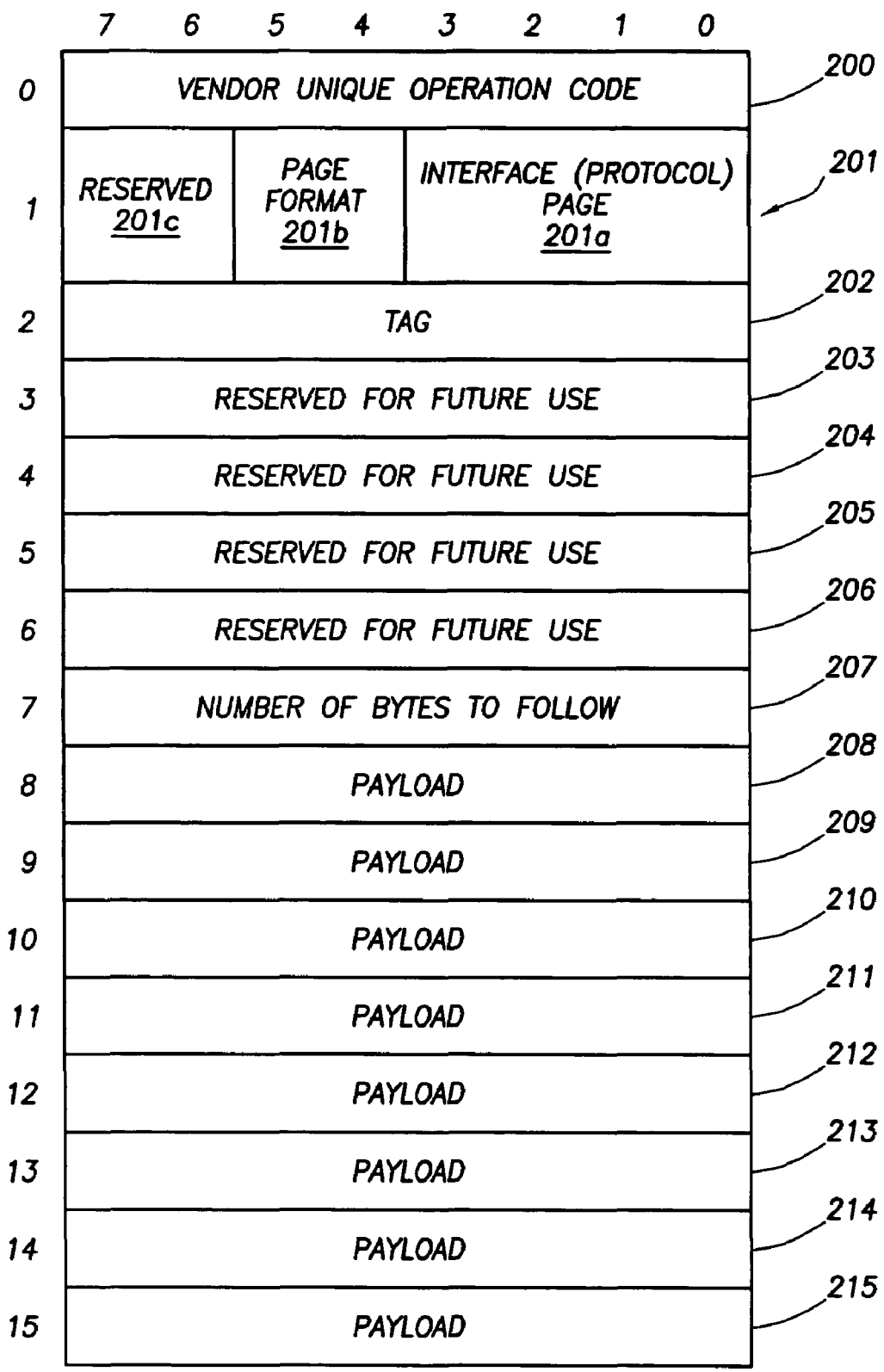
FIG. 2 is an example data structure for a Transfer Host Information (THI) command.

Referring again to FIG. 1, a THI command may be sent from appliance 120 to SCSI device 130. One example format of a THI command is shown in FIG. 2. This example THI command includes 16 bytes (bytes 0-15), which are labeled 200-215. Byte zero of the THI command is a vendor unique operation code 200. A vendor unique operation code permits some values to be vendor unique. If a value in the vendor unique range for the target device has been chosen, the firmware of that device may require modification for that device to accept the command. A vendor unique operation code that is not in use may be designated as a THI command.

Byte 1 (201) of the THI command denotes the SCSI transport protocol and a respective host interface. Bits 6-7 of byte 1 (201c) are reserved for future use. Bits 0-3 (201a) identify the protocol page. The protocol page identifies the transport and interface of the host that issued a SCSI command. One example implementation of supported interfaces (protocol) pages is shown in Table 1.

TABLE 1

Supported Interfaces (Protocol) Pages

| Interface (Protocol) Identifier | Description |
| --- | --- |
| 0h | Fibre Channel |
| 1h | Parallel SCSI |
| 3h | IEEE 1394 |
| 4h | Infiniband |
| 5h | iSCSI |
| 6h | SAS |

As shown in Table 1, one example THI command supports a fibre channel host, a parallel SCSI host, an IEEE 1394, an infiniband host, an iSCSI host and an SAS host. The specific host that issued a SCSI command is identified by a respective interface (protocol) identifier as shown in Table 1. The interface (protocol) identifiers may range from 0h through 6h as shown in Table 1. Because 4 bits are provided for the identification of the interface (protocol) page (201a), the implementation shown in FIG. 2 permits the inclusion of up to an additional 10 supported interface (protocol) pages.

Byte 1 of the THI command also includes a two bit page format field 201b. The page format field 201b may define the contents of the interface (protocol) page field. As implemented, the page format field provides for four different formats for a particular interface (protocol) page. As shown in Table 2, the iSCSI protocol page may be subdivided into two pages, one identified by 0h (IPv4 format) the second identified by 1h (IPv6 format).

TABLE 2

Page Format for iSCSI

| Value | Description |
| --- | --- |
| 0h | IPv4 |
| 1h | IPv6 |

Byte 2 of the THI command (202) provides support to pass a tag to a target device. A tag may be used as an identifier for the associated host issued command sent to the target to facilitate atomic operation and command queuing of the host issued command. If multiple device commands are pending at a device that supports command queuing, the tag field may associate a THI command with a device command. The tag of tag field 202 may comprise a tag received by the appliance as part of the original command from the host. The tag links the command issued by the host to a corresponding THI command. For example, if a device that supports command queuing has received two THI commands, and two appliance reissued SCSI commands, the tag associates a THI command with an appliance reissued command. If the target device does not support command queuing, the appliance sends the THI command and waits until the THI command is completed before reissuing the host issued command to the target device. Otherwise, if multiple commands are sent to a SCSI device that does not support command queuing, the SCSI device may abort one or more of the commands it received.

Multiple commands may be sent to, and therefore be outstanding, in a device that supports command queuing. In one example, a tag may be used to reference a buffer in the target device, the host computer, or some other device. The tag may function as an index permitting proper processing of the command. Absent a tag to associate the command, the target device may not properly process data.

Bytes 3 through 6 of the THI command (203-206) may be reserved for future use.

Byte 7 of the THI Command (207) is an identification of the number of bytes of data to follow. The number of bytes to follow should be a multiple of eight bytes according to the protocol page size.

The payload information or the interface (protocol) page information is transported within bytes 8 through 15 of the THI command (208-215). If the interface (protocol) page information is larger than eight bytes, the payload may be segmented into multiples of eight bytes along with the first eight bytes of the command descriptor block (CDB) THI command. Under these conditions, the first eight bytes are sent in the first THI command. The remaining bytes are sent in blocks of eight bytes along with the first eight bytes of the THI command. Thus, the interface (protocol) page information that extends beyond eight bytes is sent to the target device in eight byte increments along with an eight byte THI command header.

The payload information included in the THI command is dependent upon the host interface and protocol. An overview of the payload of the fibre channel page is shown in Table 3. A fibre channel page may be identified by 0h. The fibre channel page may include an eight byte fibre channel worldwide port name. The fibre channel page may also include a three byte fibre channel source ID. Finally, five reserve bytes may be included in the fibre channel page to increase the length of the page to sixteen bytes. The reserve bytes may be also used in a future implementation.

TABLE 3

| Fibre Channel Page 0h (8 bytes) |
| --- |
| FC WW Port Name (8 bytes)<br>FC Source ID (3 bytes)<br>Reserved (5 bytes) |

One example payload of a parallel SCSI page is shown in Table 4. A parallel SCSI page may be identified by 1h. The parallel SCSI page may include a one byte SCSI initiator ID, a one byte appliance relative port ID, and six bytes of reserve space.

TABLE 4

| Parallel SCSI Page 1h (8 bytes) |
| --- |
| SCSI Initiator ID (1 byte)<br>Appliance Relative Port ID (1 byte)<br>Reserved (6 bytes) |

An example payload for an IEEE 1394 page is shown in Table 5. The IEEE 1394 page may be identified by page code 3h. The IEEE 1394 page may include an eight byte IEEE EUI-64 identifier. The IEEE 1394 page may also include a two byte node ID and six bytes of reserve space.

TABLE 5

| IEEE 1394 Page 3h (16 bytes) |
| --- |
| IEEE EUI-64 Identifier (8 bytes)<br>Node ID (2 bytes)<br>Reserved (6 bytes) |

An example payload of an infiniband page is shown in Table 6. The infiniband page code may be identified by 4h and may include a sixteen byte global identifier (GIB).

TABLE 6

| Infiniband Page 4h (16 bytes) |
| --- |
| GID (16 bytes) |

An iSCSI page may be identified by a supported protocol page having a value of 5h. The page format for an iSCSI page identifies the supported Internet Protocol. For example, an IPv4 iSCSI page is shown in Table 7 (page format has a value of 0h). The IPv4 iSCSI page may include 232 bytes. The first 224 bytes may include the iSCSI name. The next four bytes may identify the IP address and a reserve space of four bytes may be included to increase the length of the page to a multiple of eight.

TABLE 7

| iSCSI Page 5h, IPv4 (232 bytes) |
| --- |
| iSCSI Name (224 bytes)<br>IP Address (4 bytes)<br>Reserved (4 bytes) |

An example payload for the IPv6 iSCSI page is shown in Table 8. This page may include 240 bytes. For IPv6, the iSCSI name may be identified by the first 224 bytes, and the next 16 bytes may encode an IP address. The iSCSI name may comprise an EUI format or an IQN format.

TABLE 8

| iSCSI Page 5h, IPv6 (240 bytes) |
| --- |
| iSCSI Name (224 bytes)<br>IP Address (16 bytes) |

An example payload for an SAS page is shown in Table 9. The SAS page may be identified by page code 6h. The SAS page includes an eight byte SAS initiator address.

TABLE 9

| SAS Page 6h (8 Bytes) |
| --- |
| SAS Initiator Address (8 bytes) |

Figure 3:
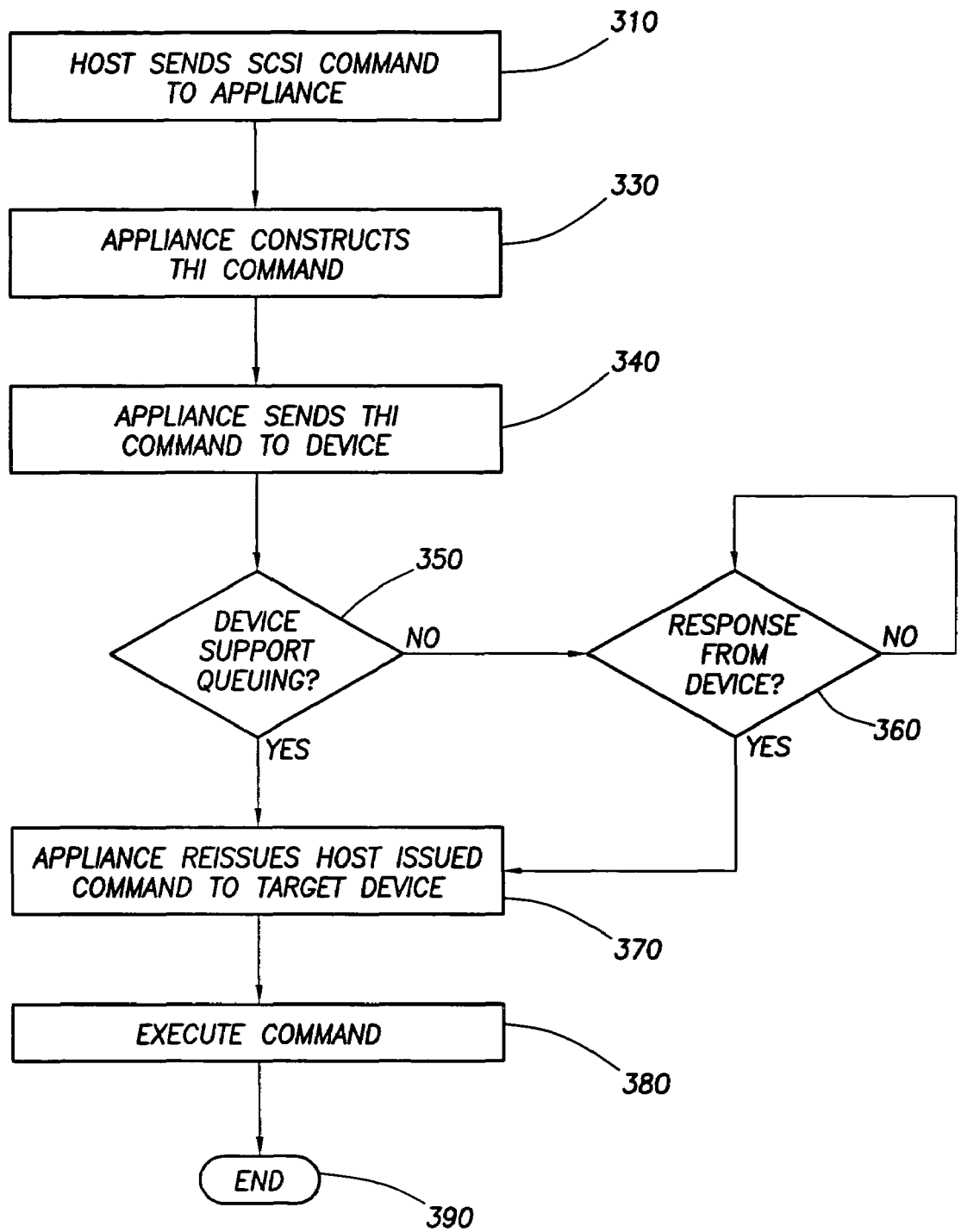
FIG. 3 is a diagram of a method for identifying host information at a SCSI layer in a multi SCSI transport protocol environment.

One example method for identifying host information at a SCSI layer is shown in FIG. 3. The method begins with a host computer sending a SCSI command to an appliance (block 310). The host computer may issue the command in any SCSI transport protocol via a respective host interface, for example, fibre channel, iSCSI, IB, IEEE 1394, or SAS. After receiving the command, the appliance may construct a Vendor Unique Command Descriptor Block (CDB) Transfer Host information (THI) (block 330). When constructing the THI command, the appliance may embed the host information as that information is available. The THI command contains the host information (page specific payload). The appliance may send the THI command to the target device (block 340). If the target device does not support command queuing, then the appliance may wait for a response from the target device (block 360) before sending the host issued command to the target device (block 370). An auto sense or appliance issued Request Sense command should be executed to clear the pending contingent allegiance before the appliance reissued the host command. Otherwise, the appliance may reissue the host issued command to the target device (block 370). The command may be executed at block 390. The THI command may be repeated for each SCSI host issued command.

Figure 4:
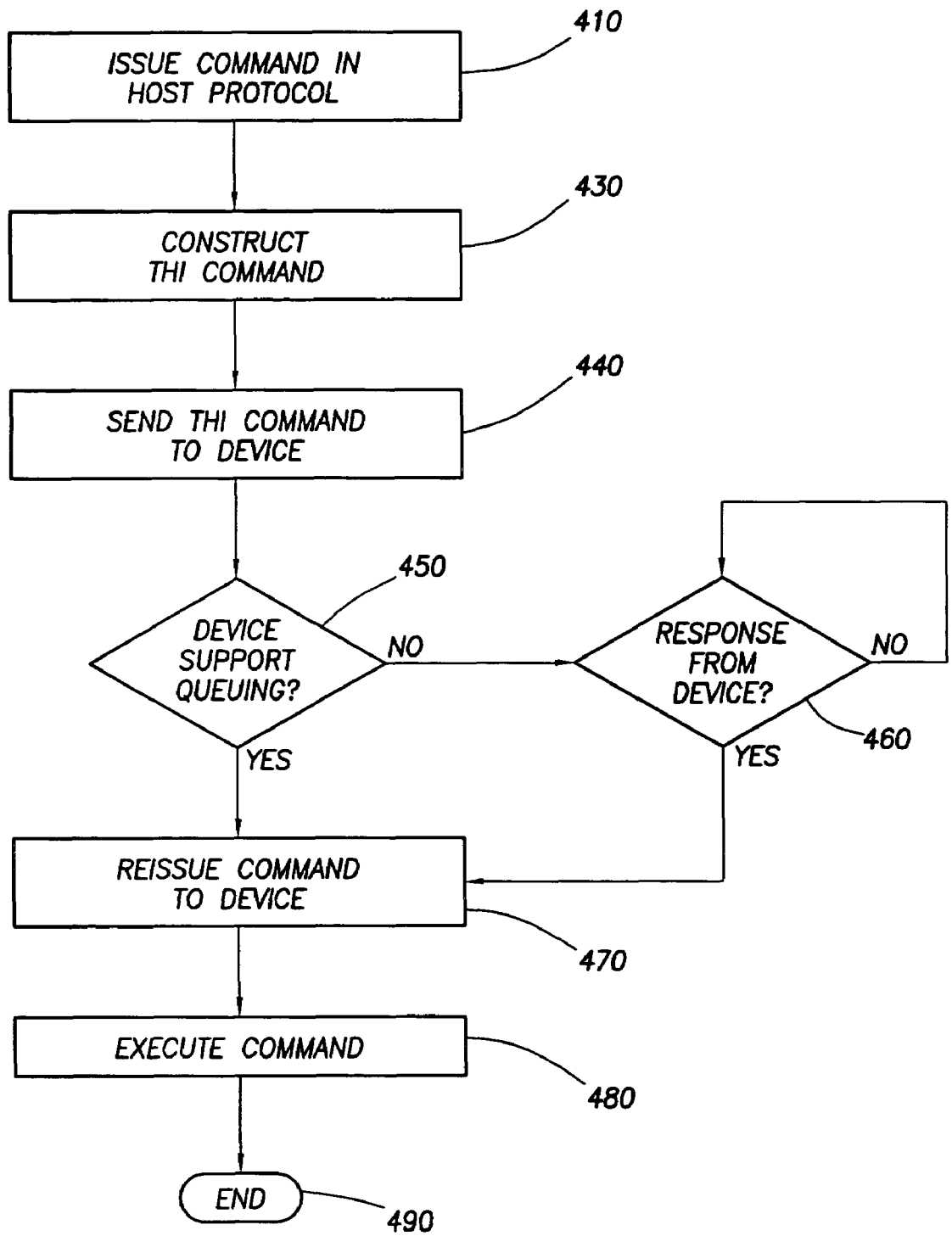
FIG. 4 is a diagram of another method for identifying host information at a SCSI layer in a multi SCSI transport protocol environment.
Figure 5:
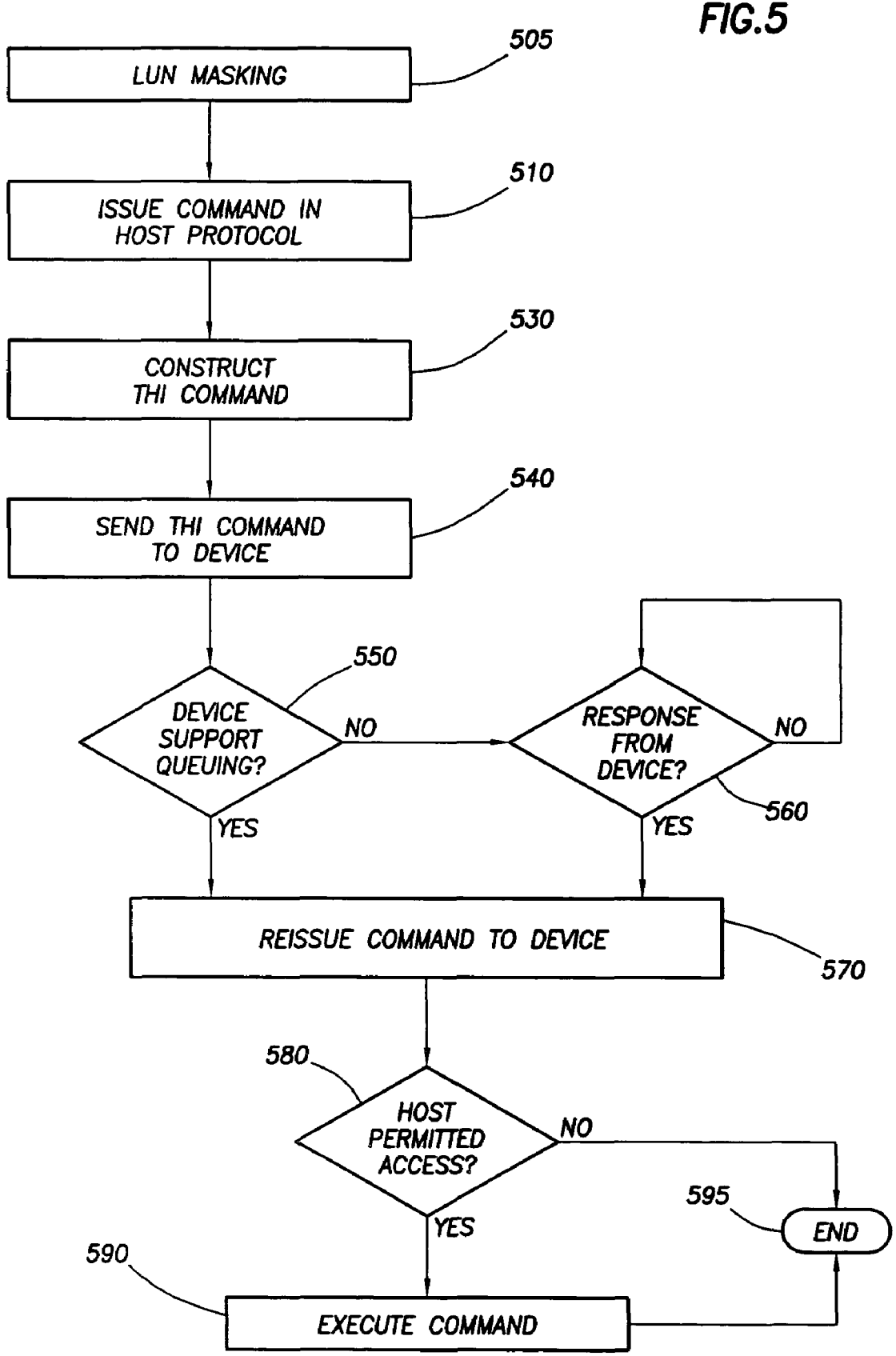
FIG. 5 is a diagram of a method for controlling host computer access to a SCSI layer.

One example method for identifying host information at a SCSI layer is shown in FIG. 4. At block 410, an issuing host issues a command in a host transport protocol via an associated interface to a SCSI device. The host interface may be iSCSI, fibre channel, infiniband, SAS, IEEE 1394, or parallel SCSI, depending on the attachment to the appliance. The command issued in the host transport protocol may be reissued by an appliance in a device transport protocol at block 420. In one example, the device protocol is a SCSI protocol.

Following conversion between different SCSI transport protocols, information about the issuing host is typically not available at the SCSI device unless the issuing host information is sent to the target SCSI device. One example construction of host information is the THI command or transfer host information command, at block 430. At this step, the appliance may build a THI command that includes host information as described in Tables 1-9 and FIG. 2. This transfer host information may be sent via a THI command to the SCSI device at block 440.

In some embodiments, the sequence of steps taken by the appliance may depend, in part, on the device. For example, if the device supports command queuing at block 450, then the appliance may reissue the command to the device at block 470. Otherwise, if the device does not support the command queuing, then the appliance may wait for the device to respond to the THI command before reissuing the command to the device. If the device does not support command queuing, the SCSI device will send either a good condition to the appliance, e.g. the device has accepted the THI command, or check condition to the appliance, e.g. the THI command is not supported by the device (block 460). In any case, after a response and possible Request Sense is received from the device at the appliance, the appliance may send the command to the SCSI target device at block 470. The SCSI target device may execute the command at block 480. The method terminates at block 490.

In conventional LUN masking, tables are created during a log in process to establish access by the host computers to the LUNs. Placing a SCSI device behind an appliance, however, may compromise the LUN functionality. In this case, the SCSI target device may lack information about the issuing host. The disclosed systems, methods, and data structures provide host information to target devices and enable SCSI target devices to maintain the LUN functionality.

In another example embodiment, the method may be used with LUN masking to control access to a storage device. In this case, LUN masking may be established at the device (block 505). Following LUN masking the host may issue a command in a host transport protocol at block 510. The appliance may construct a THI command at block 530 to transfer host information to the target device. The THI command may be sent to the device at block 540. If the target device supports command queuing (block 550), then the appliance may reissue the command to the device in the device protocol (block 570). Otherwise, in the absence of command queuing, the appliance may wait for a response to the THI command from the device at block 560 before reissuing the command to the device in the device protocol at block 570. The device may respond to the appliance with either a good condition or a check condition. After the reissued command is sent to the device, the host may gain access to the device at block 580. For example, LUN masking may refuse access by specific hosts to certain devices. If the host is refused access, the method may terminate (block 595), otherwise, if the host is permitted access to the device (block 580), then the device may execute the command (block 590). Finally, the method may terminate at block 595. If the target device executes the THI command, the device should have the host information necessary to utilize LUN masking.

Figure 6:
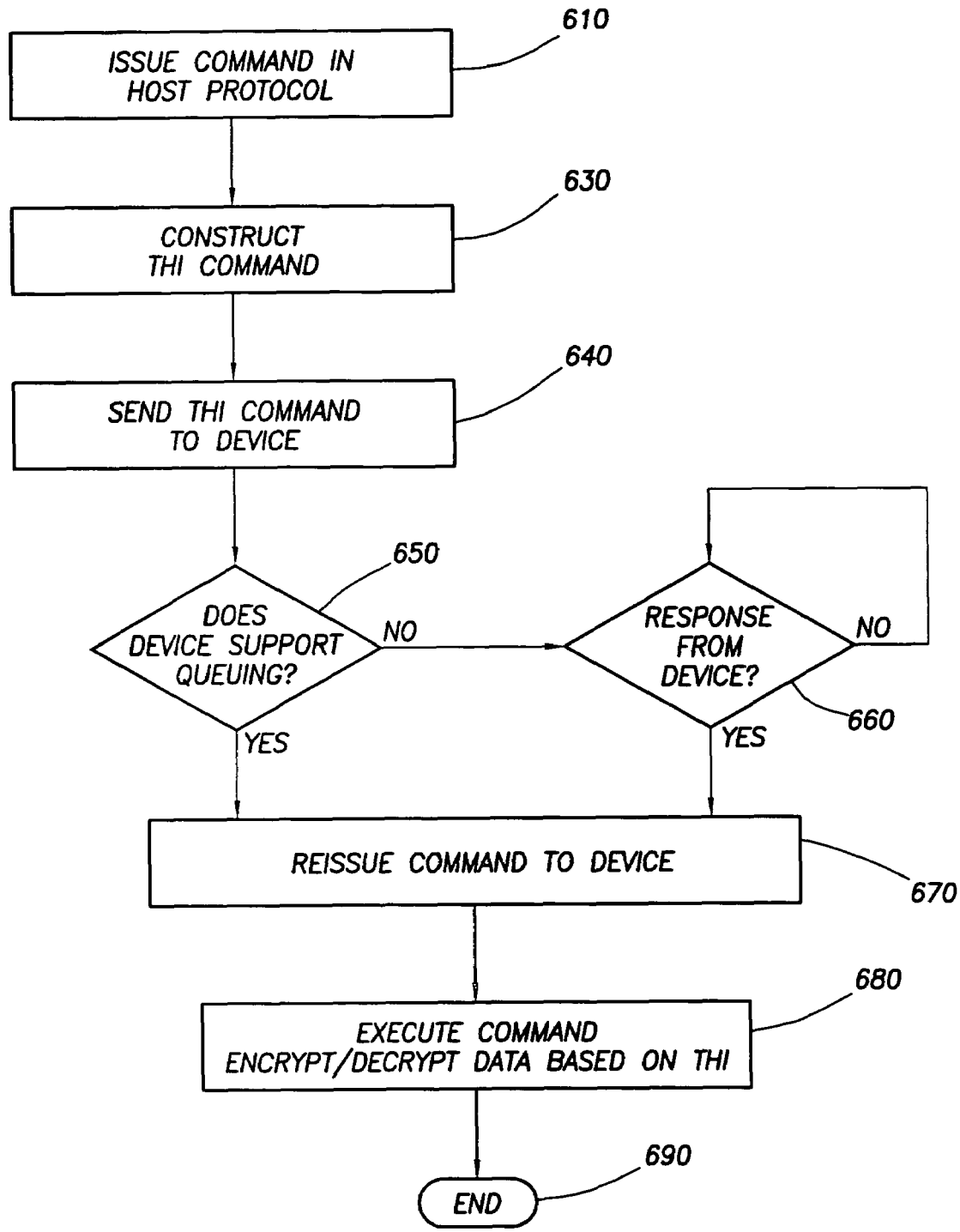
FIG. 6 is a diagram of a method for encrypting/decrypting data based upon host information at a SCSI layer.
Figure 7:
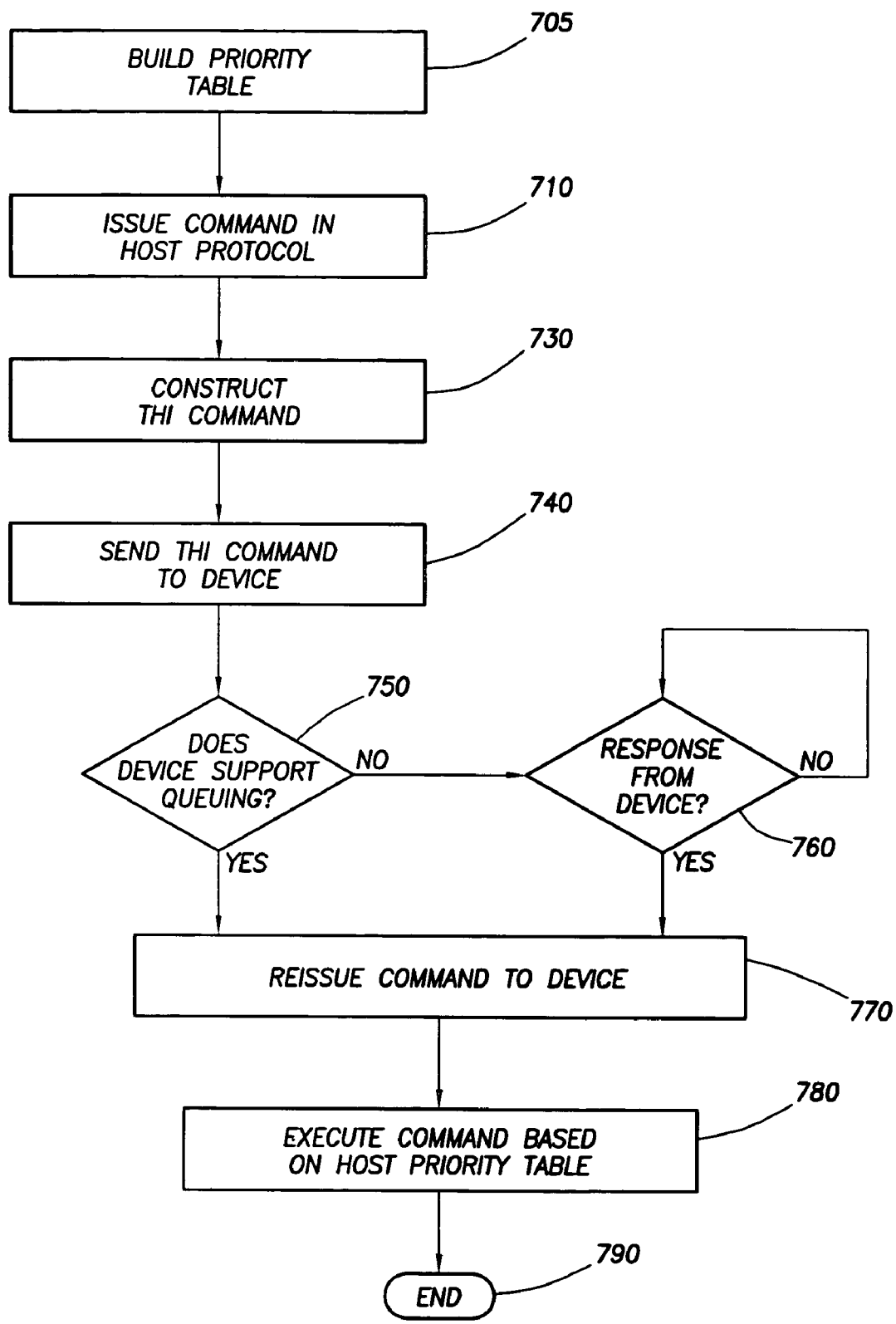
FIG. 7 is a diagram of a method for controlling execution priority of SCSI commands at a SCSI layer.

In another example embodiment, the disclosed methods may be used to encrypt or decrypt data transferred between devices or computers of an information handling system (FIG. 6). In this case, the host may issue a command in a host transport protocol (block 610). The appliance may construct the THI command or transfer host information command at block 630. The appliance may send that THI command to the device at block 640. The response of the appliance may depend upon whether the device supports command queuing. If the device does support command queuing (block 650), the appliance may reissue the host command to the device at block 670. Otherwise, if the device does not support command queuing, then the appliance may wait for a response to the THI command from the target device at block 660. The target may respond to the appliance with either a good condition or a check condition. Following a response from the device, the appliance may reissue the command to the SCSI device at block 670. At block 680, the device may execute the command. If a read command was issued, and the data to be read from the device is encrypted, the data may be decrypted during or after the read command accesses the data. In one example, the transfer host information sent in the THI command may be used as a key to encrypt or decrypt data. For example, the host port World Wide name may be used as an encryption key. In another embodiment, the host node World Wide name may be used as an encryption key. If, on the other hand, a write command has been issued, the transfer host information may encrypt the data before the data is written to the target device. Finally, at step 690, the method may end.

In still another embodiment, the disclosed systems and methods may be used to establish execution priority based upon the transfer host information at the device level. The method begins at block 705 where a priority table is built. A host issues a command in a host transport protocol (block 710). A THI command may be constructed by the appliance at block 730 and sent to the device (block 740). The action of the appliance is dependant upon whether the device supports command queuing. If the device supports command queuing, the appliance may reissue the command to the device (block 770). Otherwise if the device does not support command queuing, the appliance waits for a response from the device (block 760). The device may respond with either a good condition or a check condition. After receiving a response, the appliance may reissue the command to the device (block 770). The command may be executed at block 780. The execution of the command may depend upon the priority table that was built at block 705. The priority table may be part of a priority database. Priority parameters may be included in the priority database. Each priority parameter may serve as a metric measuring the relative execution property of a command. For example, commands with a higher priority parameter may be executed before a command with a lower priority parameter. Thus, one host may be given priority over another host, and a particular command from a host may be executed before command issued from another host. Finally the method ends at block 790.

The disclosed methods, systems, and data structures may enhance quality of service at the target device. Because host information is available to the target device, an appliance with reduced intelligence or logic may be used. The need for an appliance to perform virtualization, LUN mapping, or server provisioning is reduced since some of these functions may be performed efficiently at the device level. Moreover, the addition of a bridge in front of a device that performs functions such as virtualization, LUN mapping, or server provisioning may compromise the device's ability to perform some or all of those functions. By providing host information to these devices, the ability of the devices to perform these functions may be enhanced.

The invention, therefore, is well adapted to carry out the objects and to attain the ends and advantages mentioned, as well as others inherent therein. While the invention has been depicted, described and is defined by reference to exemplary embodiments of the invention, such references do not imply a limitation on the invention, and no such limitation is to be inferred. For example, although disclosed with respect to Fibre Channel, iSCSI, IEEE 1394, Infiniband, SAS, and parallel SCSI, this invention provides infrastructure to support additional protocols. Additionally, the invention is not limited in any way by the number of nodes, but is scalable to support additional nodes in the system. Furthermore, each host may include one or more interfaces for issuing commands in one or more SCSI transport protocols. The invention is not limited to SCSI commands, transports, and protocols, but may be applied to any command, transport, and protocol. The invention is capable of considerable modification, alternation and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A method for identifying host information at a physical layer of an information handling system, the information handling system including a host computer, the method comprising the steps of:

issuing a command from a host computer, the command being issued in a first transport protocol; and sending a host information command to a device, the host information command including a host identifier identifying the host that issued the command and a tag identifying a reissued command, the reissued command including the command reissued in a second transport protocol, wherein the device does not support command queuing, further comprising the steps of:

receiving a response from the device, the response being sent following a receipt of the host information command by the device; and reissuing the command to the device, the command being reissued in the second transport protocol.

2. The method of claim 1, further comprising the step of: reissuing the command to the device, the command being reissued in the second transport protocol.

3. The method of claim 1, wherein an appliance performs the step of sending a host information command to a device.

4. The method of claim 1, wherein an appliance performs the step of reissuing the command to the device.

5. The method of claim 1, wherein an appliance receives the command issued from the host computer.

6. The method of claim 1, wherein the appliance receives a response from the device and reissues the command to the device.

7. The method of claim 1, further comprising the step of: providing device access to the host computer.

8. The method of claim 1, further comprising the step of: executing the reissued command.

9. The method of claim 8, wherein the step of executing the reissued command further comprising the steps of:

creating a priority database, the priority database associating a priority parameter and a command from a host, the priority parameter being a metric measuring a relative execution property of the command in the association; and executing the reissued command, based in part on the priority database.

10. The method of claim 8, wherein the command includes a command for accessing encrypted data of the storage device, further comprising the step of:

decrypting the data based on the host information command.

11. The method of claim 8, wherein the command includes a command for writing data to the storage device, further comprising the step of:

encrypting the data based on the host information command.

12. The method of claim 1, wherein the first transport of protocol includes a SCSI protocol.

13. The method of claim 1, wherein the first transport protocol is iSCSI, FCP, SRP, SSP, U320, or SBP.

14. The method of claim 1, wherein the second transport protocol includes a SCSI protocol.

15. The method of claim 1, wherein the second transport protocol is iSCSI, FCP, SRP, SSP, U320, or SCP.

16. The method of claim 1, wherein first transport protocol is equivalent to the second transport protocol.

17. The method of claim 1, wherein the host identifier includes at least one of a port World Wide name, a node World Wide name, a source identifier, an initiator identifier, an appliance port relative address, an iSCSI name, an Internet Protocol version 4 address (IPv4), an Internet Protocol version 6 address (IPv6), an infiniband (IB) Global Identifier, a serial attached SCSI (SAS) initiator address, an IEEE identifier, or a node identifier.

18. An information handling system for identifying host information at a physical layer of an information handling system, the information handling system comprising:

a host computer, the host computer issuing a command in a first transport protocol;

a device; and an appliance, the appliance sending a host information command to the device, the host information command including a host identifier identifying the host that issued the command and a tag identifying a reissued command, the reissued command including the command reissued in a second transport protocol, wherein the device does not support command queuing, and wherein the appliance receives a response from the device, the response being sent following a receipt of the host information command by the device, and reissues the command to the device, the command being reissued in the second transport protocol.

19. The information handling system of claim 18, wherein the appliance reissues the command to the device, the command being reissued in a second transport protocol.

20. The information handling system of claim 18, wherein an appliance receives the command issued from the host computer.

21. The information handling system of claim 18, wherein the host computer is provided access to the device.

22. The information handling system of claim 18, wherein the device executes the reissued command.

23. The information handling system of claim 22, the information handling system further comprising a priority database, the priority database associating a priority parameter and a command from a host, the priority parameter being a metric measuring a relative execution property of the command in the association, and wherein the reissued command is executed, based in part on the priority database.

24. The information handling system of claim 22, wherein the command includes a command for accessing encrypted data of the storage device, and wherein the data is decrypted based on the host information command.

25. The method of claim 22, wherein the command includes a command for writing data to the storage device, and wherein the data is encrypted based on the host information command.

26. The method of claim 18, wherein the first transport protocol is iSCSI, FCP, SRP, SSP, U320, SBP, or SCSI.

27. The method of claim 18, wherein the second transport protocol is iSCSI, FCP, SRP, SSP, U320, SCP, or SCSI.

28. The method of claim 18, wherein the host identifier includes at least one of a port World Wide name, a node World Wide name, a source identifier, an initiator identifier, an appliance port relative address, an iSCSI name, an Internet Protocol version 4 address (IPv4), an Internet Protocol version 6 address (IPv6), an infiniband (IB) Global Identifier, a serial attached SCSI (SAS) initiator address, an IEEE identifier, or a node identifier.

* * * * *